(12) United States Patent
Shi et al.

(10) Patent No.: US 7,720,470 B2
(45) Date of Patent: May 18, 2010

(54) REFERENCE SIGNALS FOR DOWNLINK BEAMFORMING VALIDATION IN WIRELESS MULTICARRIER MIMO CHANNEL

(75) Inventors: Jun Shi, San Jose, CA (US); Qinghua Li, Sunnyvale, CA (US); Hongmei Sun, Beijing (CN); Minnie Ho, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 997 days.

(21) Appl. No.: 11/455,891

(22) Filed: Jun. 19, 2006

(65) Prior Publication Data

US 2007/0293172 A1 Dec. 20, 2007

(51) Int. Cl.
*H04W 24/00* (2009.01)
*H04B 1/18* (2006.01)

(52) U.S. Cl. .................................. 455/425; 455/187.1
(58) Field of Classification Search .................. 455/424, 455/425, 187.1
See application file for complete search history.

(56) References Cited

U.S. PATENT DOCUMENTS

| | | | |
|---|---|---|---|
| 2005/0286663 A1* | 12/2005 | Poon | 375/347 |
| 2006/0098754 A1 | 5/2006 | Kim et al. | |
| 2006/0104382 A1 | 5/2006 | Yang et al. | |

FOREIGN PATENT DOCUMENTS

EP   1657829 A1   5/2006

OTHER PUBLICATIONS

Nortel, "On MIMO-OFDM Downlink Pilots and Pre-coding Index Feedback", 3GPP TSG-RAN working group 1 Meeting #44bis, (Mar. 27-31, 2006), 20 Pages.*

"International Search report and Written Opinion", PCT/US2007/070868, (Oct. 30, 2007), 1-11 pgs.

"3rd Generation Partnership Project: Technical Specification Group Radio Access Network; Physical Layer Aspects for Evolved UTRA", *3GPP TR 25.814; V1.2.1*, (2006), 84 pages.

"Considerations on the downlink pilot supporting Beamforming for TDD mode", *3GPP TSG RAN WG1 LTE Ad Hoc*, Helsinki, Finland, (Jan. 23-25, 2006), 7 pages.

"On MIMO-OFDM Downlink Pilots and Pre-Coding Index Feedback", *3GPP TSG-RAN Working Group 1 Meeting #44bis*, (Mar. 27-31, 2006), 20 pages.

* cited by examiner

*Primary Examiner*—George Eng
*Assistant Examiner*—Christopher M Brandt
(74) *Attorney, Agent, or Firm*—The Law Offices of John C. Scott, LLC; John C. Scott

(57) ABSTRACT

Dedicated pilot signals are transmitted from a transmitting device to a receiving device through a multicarrier MIMO channel in addition to data signals and common pilot signals. The dedicated pilot signals may be used by the receiving device to validate whether a predetermined beamforming matrix (i.e., a beamforming matrix identified by the receiving device) was used by the transmitting device to precode the transmitted data. If a different beamforming matrix was used for the preceding, the receiving device may use this matrix to demodulate the received data.

24 Claims, 4 Drawing Sheets

REFERENCE SIGNALS FOR DOWNLINK BEAMFORMING VALIDATION IN WIRELESS MULTICARRIER MIMO CHANNEL

TECHNICAL FIELD

The invention relates generally to wireless communication and, more particularly, to techniques for improving performance in a wireless MIMO channel.

BACKGROUND OF THE INVENTION

Multiple input, multiple output (MIMO) is a wireless communication technique that uses multiple antennas at each end of a communication channel. That is, a transmitting device uses multiple transmit antennas to transmit signals into one end of the wireless channel and a receiving device uses multiple receive antennas to receive the signals at the other end of the wireless channel. By using multiple antennas at each side of the channel, the spatial dimension can be taken advantage of in a manner that improves overall communication performance. MIMO can be implemented as an open loop or a closed loop technique. In open loop MIMO, a transmitting device does not have knowledge of the state of the channel before transmitting a signal into the channel. In closed loop MIMO, on the other hand, the transmitting device acquires a beamforming matrix (that is based on present channel conditions) that it uses to precondition or precode signals before transmitting them into the channel.

Closed loop MIMO may be practiced using either implicit feedback or explicit feedback. Implicit feedback relies on the property of channel reciprocity to obtain information about a MIMO channel within a transmitting device. That is, the reciprocal property of the channel allows the transmitting device to calculate a channel matrix for the forward direction channel from channel information observed for the reverse direction channel. Implicit feedback requires calibrations to be performed for the transmitting device and the receiving device to accurately model the overall channel as a reciprocal component. Explicit feedback transmits training symbols in the forward direction from the transmitting device to the receiving device. The receiving device then develops the beamforming matrix using the training symbols and transmits it back to the transmitting device as feedback. When explicit feedback is used, complicated system calibrations are not required.

When using explicit feedback in a closed loop MIMO channel, a problem may arise if the quality of the return channel is low. That is, errors generated in the return channel may corrupt the beamforming matrix information so that the matrix received by the transmitting device is different from the one transmitted by the receiving device. In some networks, forward error correction (FEC) may be used in the return channel to correct errors that occur therein. However, FEC coding is typically only capable of correcting a certain number of errors. If the number of errors within the fed back information exceeds this number, then the transmitting device may end up using the wrong beamforming matrix to precode data before transmission. The receiving device may then use the originally selected beamforming matrix to demodulate the transmitted data, leading to faulty communication.

DETAILED DESCRIPTION

Figure 1:
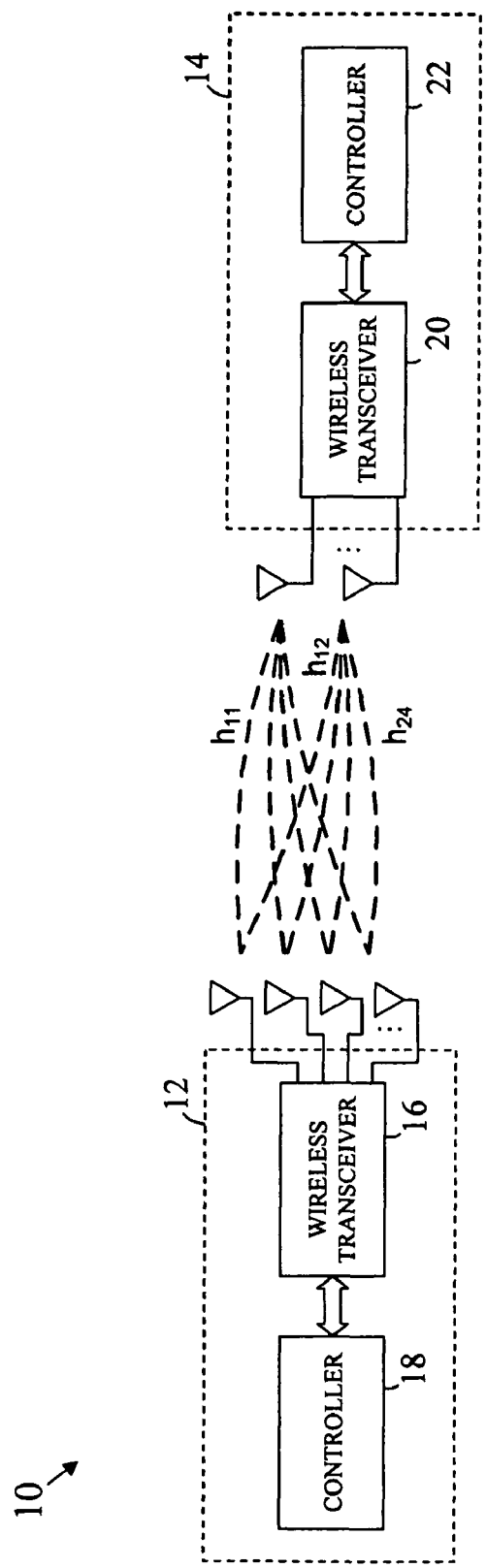
FIG. 1 is a block diagram illustrating an example wireless networking arrangement in accordance with an embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 is a block diagram illustrating an example wireless networking arrangement 10 in accordance with an embodiment of the present invention. As illustrated, a transmitting device 12 is communicating with a receiving device 14 via a wireless communication channel. In at least one embodiment, the transmitting device 12 is a wireless base station (BS) and the receiving device 14 is a wireless subscriber station (SS) that is accessing a larger network through the BS. In such an embodiment, the wireless BS may also be providing simultaneous access services to a number of other SSs in addition to the receiving device 14. The receiving device 14 may include any type of wireless component, device, or system that is capable of wirelessly accessing a network.

As illustrated in FIG. 1, the transmitting device 12 and the receiving device 14 each have multiple (i.e., two or more) antennas. The wireless channel between the transmitting device 12 and the receiving device 14 is a multiple input, multiple output (MIMO) channel. In the illustrated embodiment, the transmitting device 12 and the receiving device 14 each have a single set of antennas that may be used for both transmit and receive functions. In other embodiments, the transmitting device 12 and/or the receiving device 14 may use a different set of antennas for transmit and receive. Any type of antennas may be used including, for example, dipoles, patches, helical antennas, antenna arrays, and/or others.

In the embodiment of FIG. 1, the wireless transmitting device 12 includes a wireless transceiver 16 and a controller 18. The controller 18 is operative for carrying out some or all of the digital processing functions required to support closed loop MIMO operation for the transmitting device 12. The controller functions may be carried out using, among other things, one or more digital processing devices such as, for example, a general purpose microprocessor, a digital signal processor (DSP), a reduced instruction set computer (RISC), a complex instruction set computer (CISC), a field programmable gate array (FPGA), an application specific integrated circuit (ASIC), and/or others, including combinations of the above. The wireless transceiver 16 is operative for performing the radio frequency (RF) related functions required to (a) generate RF transmit signals for delivery to the multiple antennas during transmit operations and (b) process the RF signals received by the multiple antennas during receive operations. The receiving device 14 of FIG. 1 also includes a wireless transceiver 20 and a controller 22. These elements may perform functions similar to the corresponding units within the transmitting device 12.

In at least one embodiment, the transmitting device 12 and the receiving device 14 may be configured to use orthogonal frequency division multiplexing (OFDM) techniques (or other multicarrier techniques). In an OFDM system, data to be transmitted is distributed among a plurality of substantially orthogonal, narrowband subcarriers. In at least one embodiment, a form of OFDM known as orthogonal frequency division multiple access (OFDMA) may be used. OFDMA allows the subcarriers of an OFDM symbol to be divided among multiple different users to provide multiple access within a single symbol.

The network arrangement 10 of FIG. 1 may use explicit feedback, closed-loop MIMO techniques to support data transmission from the transmitting device 12 to the receiving device 14. For example, the transmitting device 12 may first transmit training symbols to the receiving device 14 through the MIMO channel. The receiving device 14 may then use the received training symbols to determine a beamforming matrix (or multiple beamforming matrices) for the transmitting device 12 to use to transmit data to the receiving device 14. Once the beamforming matrix has been determined, the receiving device 14 may transmit the matrix (or some information uniquely identifying the matrix) to the transmitting device 12. The transmitting device 12 may then use the beamforming matrix to precode user data before transmitting the data to the receiving device 14 through the MIMO channel. In some embodiments, multiple beamforming matrices may be fed back to the transmitting device 12 for use at different frequencies.

Due to channel variation and additive noise in the channel from the receiving device 14 to the transmitting device 12 (e.g., the uplink channel), the transmitting device 12 will sometimes decode the beamforming index from the receiving device 14 erroneously. Even when forward error correction (FEC) coding is used in this return channel, situations may arise where erroneous decoding of the beamforming index occurs. When an index is improperly decoded, the transmitting device 12 may use a beamforming matrix other than the one indicated by the receiving device 14 to precode the data being transmitted to the receiving device 14. When the transmitted data is subsequently received by the receiving device 14, the receiving device 14 will use the beamforming matrix that it identified to recover the data from the received signal. This situation can result in major data decoding errors in the receiving device 14. In accordance with one aspect of the present invention, techniques are provided that allow a receiving device in a closed loop MIMO arrangement to verify that the proper beamforming matrix was used for precoding by a corresponding transmitting device, before data decoding is undertaken. If an improper matrix was used by the transmitting device, then the receiving device may be able to determine which beamforming matrix was used by the transmitting device and use that beamforming matrix for data decoding.

In at least one embodiment of the present invention, special dedicated pilot signals are included with the precoded data transmitted from a transmitting device to a receiving device that allow the receiving device to verify whether the appropriate beamforming matrix was used by the transmitting device for preceding. These dedicated pilot signals may be included in addition to any common pilot signals that are used for estimation and synchronization purposes.

Figure 2:
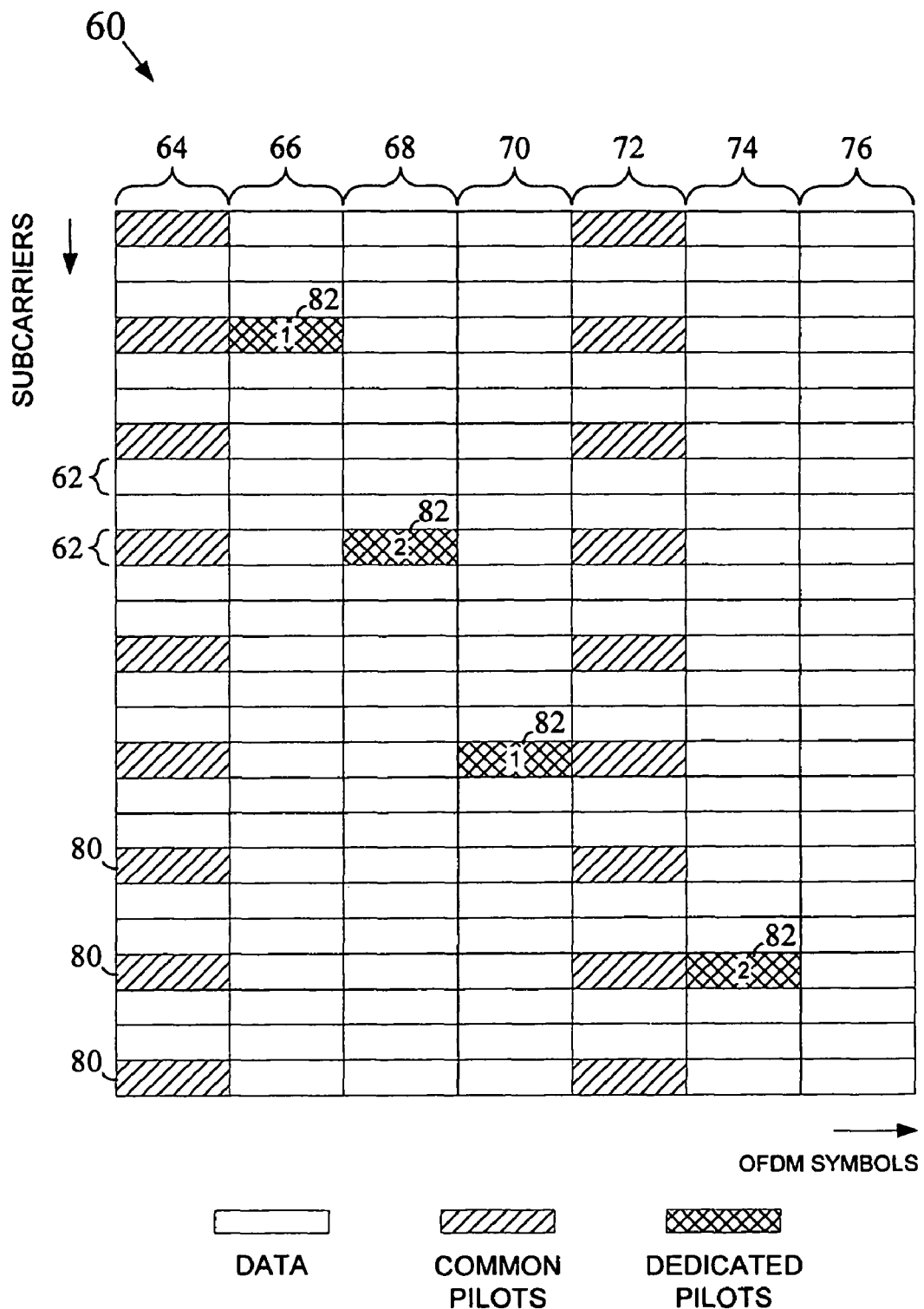
FIG. 2 is a diagram illustrating an example downlink physical resource block associated with a receiving device that includes dedicated pilots in accordance with an embodiment of the present invention.

FIG. 2 is a diagram illustrating an example DL physical resource block (PRB) 60 that has been assigned to a particular SS in accordance with an embodiment of the present invention. As shown, the DL PRB 60 includes a plurality of subcarriers 62 that have been allocated to the SS for use in transmitting data from the BS to the SS. As described previously, this does not have to include all of the subcarriers of an OFDM symbol. In addition, the DL PRB 60 may extend across multiple OFDM symbols 64, 66, 68, 70, 72, 74, 76. All of the subcarriers within the DL PRB 60 share the same beamforming matrix. That is, the same matrix will be used to precode data transmitted in each of the subcarriers.

As shown in FIG. 2, the DL PRB 60 includes a plurality of common pilot symbols 80 for use in estimation and/or synchronization. The common pilots 80 may be distributed at fixed subcarrier intervals within an OFDM symbol (e.g., every third subcarrier in FIG. 2). In addition, the common pilots 80 do not have to be used within every OFDM symbol. For example, in the illustrated embodiment, only the first and fifth OFDM symbols 64, 72 of the DL PRB 60 include common pilots 80. In addition to the common pilots 80, the DL PRB 60 also includes a number of dedicated pilots 82 for use by the corresponding SS to verify that the correct beamforming matrix was used by the BS to precode data before transmission. The remainder of the DL PRB 60 may be used to transmit user data from the BS to the corresponding SS.

The dedicated pilots 82 of the DL allocation 60 may each carry known data about the beamforming matrix. The dedicated pilots 82 may also assist with the channel estimation of the beamformed channel. Any number of dedicated pilots may be included within a DL allocation. The more dedicated pilots that are used, the greater the ability will be to validate the beamforming matrix. However, as the number of dedicated pilots is increased, the amount of user data that the DL physical resource block 60 will be able to transfer will decrease. In practice, a tradeoff will need to be made between validation strength and the amount of data that will be transferred. In at least one embodiment of the present invention, the number of dedicated pilots that are used per physical resource block is limited to the number of transmit antennas in the transmitting device. An additional reduction in the number of dedicated pilots may be achieved by assigning only one dedicated pilot for each beamformed spatial channel. This technique, however, requires the use of dynamic pilot allocation, which may be undesirable.

In at least one embodiment of the present invention, the dedicated pilots are uniformly spaced in time and frequency within a resource allocation, with random offsets to avoid interference from neighbor cells. For example, if a DL physical resource block consists of subcarriers indexed from 0 through $N_c-1$ and OFDM symbols indexed from 0 through $N_o-1$, then the dedicated pilots may be assigned at:

$$f_i = \mod\left(i * \left\lfloor \frac{N_c}{N_d} \right\rfloor + O_f, N_c\right), \text{ for } i = 0, 1, \ldots, N_d - 1$$

$$t_i = \mod\left(i * \left\lfloor \frac{N_o}{N_d} \right\rfloor + O_t, N_o\right), \text{ for } i = 0, 1, \ldots, N_d - 1$$

where $f_i$ and $t_i$ are the subcarrier and symbol indices of the dedicated pilots, respectively; $N_d$ is the number of dedicated pilots in a physical resource block; mod( ) is the modulo operation; and $O_f$ and $O_t$ are random offsets in frequency and time determined by the base station. Other techniques for assigning dedicated pilots may alternatively be used.

In at least one embodiment of the invention, the dedicated pilots are assigned to the spatial streams (or spatial channels) of the beamformed channel in a round-robin fashion. An example of this is illustrated in FIG. 2. In the figure, the dedicated pilots 82 are each labeled with a corresponding spatial stream value identifying the stream the pilot is assigned to. As shown, the first dedicated pilot 82 (in OFDM symbol 66) is associated with spatial stream 1, the second dedicated pilot 82 (in OFDM symbol 68) is associated with spatial stream 2, the third dedicated pilot 82 (in OFDM symbol 70) is associated with spatial stream 1, and the fourth dedicated pilot 82 (in OFDM symbol 74) is associated with spatial stream 2. The reason the dedicated pilots are assigned in this manner is ensure that each stream has as equal validation strength as possible. Other techniques for assigning dedicated pilots to spatial streams may be used in other embodiments.

In at least one embodiment of the invention, a matrix P is defined to represent the value of the dedicated pilots. P is an $N_s \times N_d$ matrix, where $N_s$ is the number of streams and $N_d$ is the number of dedicated pilots. Each column of P is a vector in the form [0, 0, . . . 1, . . . 0] with all the entries being zero except the $i^{th}$ entry, where i is the stream index assigned to the vector. During transmission, the value of a dedicated pilot at the transmit antenna will be T=VP, where V is the beamforming matrix. After the dedicated pilot has propagated through the channel, the receiver will receive the following signal:

$$Y = HVP + N$$

where H is the channel matrix and N is the additive noise. As discussed previously, the primary purpose of the validation is to determine whether the matrix V used by the transmitting device is the same one that was fed back by the receiving device. In at least one embodiment of the present invention, maximum likelihood (ML) detection is employed to identify, based on Y, the beamforming matrix that was used at the transmitter. This may be performed as follows:

$$V^* = \underset{V_i \in Codebook}{\arg\min} \|Y - HV_iP\|^2 \quad \text{[Equation 1]}$$

where V* is the estimate of the beamforming matrix used.

If V* is not the same matrix that the receiving device fed back to the transmitting device, then either an error occurred in the uplink or the ML detection caused a false alarm. Noise in the channel can potentially increase the probability of detection error. To reduce the occurrence of false alarms, a thresholding mechanism may be used. For example, in at least one embodiment, the following thresholding mechanism is used:

$$\begin{cases} \text{No Validation} & \text{if } \|Y - HV_iP\| < 7\sigma_n^2 - 0.5\log_{10}(p_e) \\ \text{Validation in Equation 1} & \text{otherwise} \end{cases}$$

where $\sigma_n^2$ is the noise power and $p_e$ is the uplink bit error rate (BER). In this manner, only large deviations need to be considered.

As described above, in at least one embodiment of the present invention, ML detection is used to perform the beamforming matrix validation using the dedicated pilots. In other embodiments, other detection techniques may be used for the validation. In some embodiments, ML detection is used for matrix validation, while other techniques are used to demodulate the data subcarriers.

In some scenarios, the dedicated pilots may not be able to provide a level of validation power adequate to reliably validate the beamforming matrix. In such scenarios, the data symbols may be used as a further check on the accuracy of the validation procedure. The data symbols may be used for validation by exploiting knowledge about the modulation constellation of the data. For each transmitted data symbol, the receiver will receive x=HVd+n, where d is $N_s$ by 1 data vector, x is $N_r$ by 1 received data vector, and n is $N_r$ by 1 noise vector. The value of d is a complex value from a known constellation (e.g. QPSK, 16 QAM, 64 QAM, etc.). The receiver forms a subset of the codebook, $C_v$, whose elements have a large likelihood in Equation 1 above (i.e., a small value of $\|Y-HV_iP\|^2$). For each beamforming matrix $V_i$ in the codebook subset, the receiving device computes a cost $e(V_i)$. The receiving device collects a set of received data vectors, $C_x$. For each received data vector x in the set, the receiving device removes the beamformed channel effect (assuming the beamformed channel is $HV_i$) as $\tilde{d}=\text{inv}(HV_i)x$, where inv(A) is the inverse or pseudo inverse of the input matrix A.

Since the modulation of each entry of d is known at the receiver, the receiver quantizes each entry of $\tilde{d}$ using the known modulation constellation and obtains the quantized $\hat{d}$. That is, the entry of $\tilde{d}$ is rounded to the nearest constellation point that is the corresponding entry of $\hat{d}$. The cost of the $V_i$ is computed as:

$$e(V_i) = \sum_{x \in C_x} \|\hat{d} - \tilde{d}\|^2.$$

The beamforming matrix with the lowest cost ($\hat{V}$) is reported as the one used in the transmitter:

$$\hat{V} = \underset{V_i \in C_v}{\arg\min} \, e(V_i).$$

The codebook search in Equation 1 above can be prohibitively complex if the codebook is large. In at least one embodiment of the present invention, the structure of the matrix P is taken advantage of in a manner that allows the complexity of the search to be reduced significantly. That is, instead of a full codebook search, a column-wise search may be performed as follows:

$$v_i^* = \underset{V_i \in Codebook}{\arg\min} \ \|Y_i - Hv_i\|_2^2 \ \ i = 1, \ldots, N_s \qquad \text{[Equation 2]}$$

where $Y_i$ is the $i^{th}$ column of Y, $v_i$ is $i^{th}$ column of V, and $N_s$ is the number of spatial streams. As shown, P has been dropped from Equation 2 because of its structure. As an example of the reduction in complexity, consider a situation where 6, 5, and 4 bits are used to describe the first, second, and third columns of matrix V. Equation 1 would require a search of over $2^{15}$ matrices, while Equation 2 only requires a search of 112 vectors.

Figure 3:
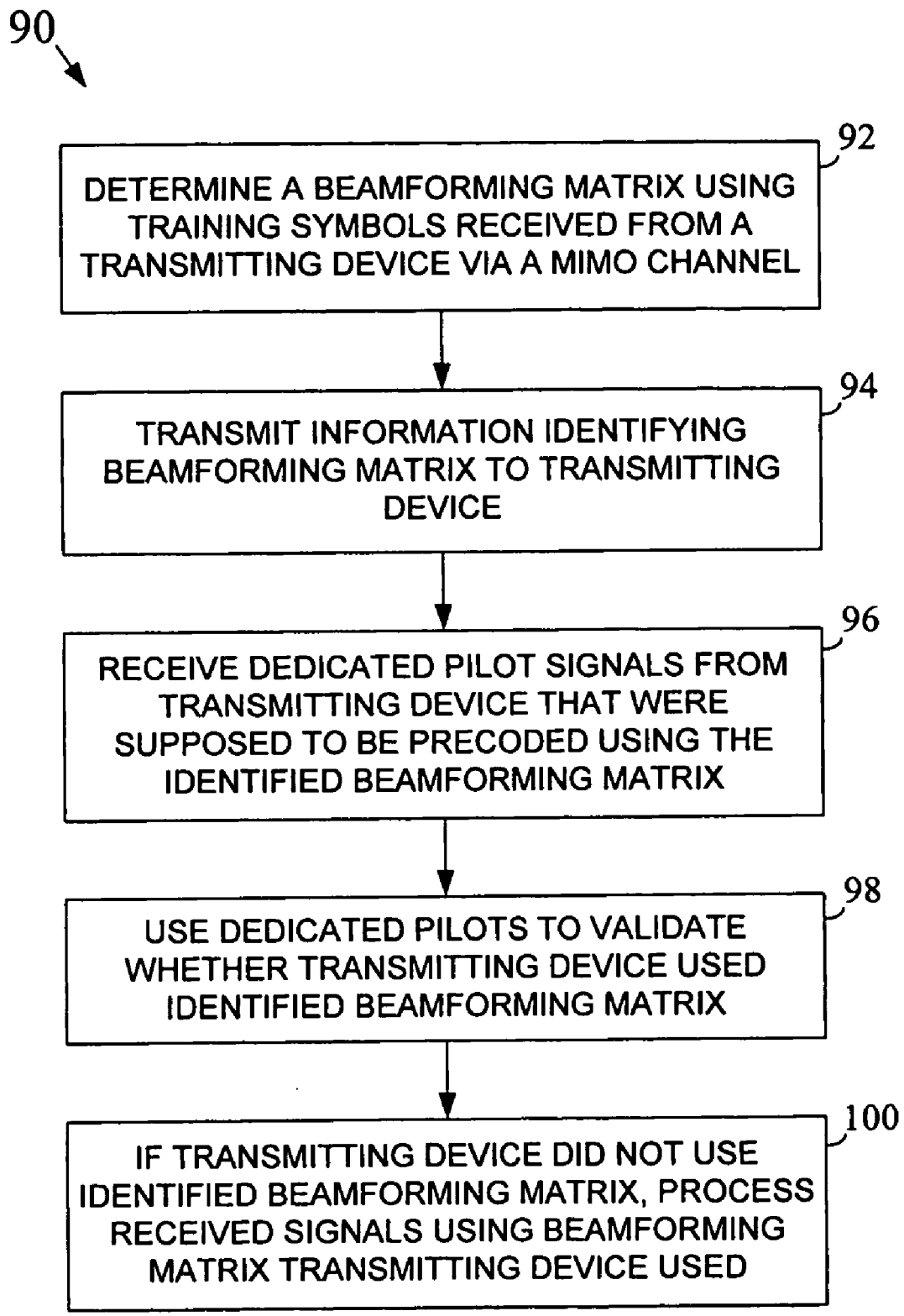
FIG. 3 is a flowchart illustrating an example method for use in a receiving device associated with a multicarrier MIMO channel in accordance with an embodiment of the present invention.

FIG. 3 is a flowchart illustrating an example method 90 for use in a receiving device associated with a multicarrier MIMO channel in accordance with an embodiment of the present invention. First, a beamforming matrix is determined for use in connection with a MIMO channel between a transmitting device and a receiving device using training symbols received from the transmitting device via the MIMO channel (block 92). The training symbols may first be used within the receiving device to generate a channel matrix H for the MIMO channel. The channel matrix H may then be used to determine the beamforming matrix. Any known technique may be used to determine the beamforming matrix (SVD decomposition, zero forcing, search through set of known matrices, etc.). Information may next be delivered to the transmitting device that identifies the beamforming matrix (block 94). This information may include, for example, an index number associated with the beamforming matrix (the index number being known within the transmitting device). Other techniques for identifying the selected matrix may alternatively be used.

Dedicated pilot signals may subsequently be received by the receiving device from the transmitting device (in addition to other data) that were supposed to have been generated using the identified beamforming matrix (block 96). The dedicated pilots should include data known to the receiving device. The receiving device may then use the dedicated pilot signals to validate whether the transmitting device used the correct beamforming matrix to precode the data (block 98). In at least one embodiment, the receiving device may use maximum likelihood (ML) detection techniques to perform the validation. The receiving device may also estimate which beamforming matrix the transmitting device actually used. If it is determined that the transmitting device did not use the appropriate beamforming matrix, then the receiving device can process the user data signals received from the transmitting device using the beamforming matrix that it believes the transmitting device did use. In at least one embodiment, a low complexity codebook search is employed during the verification process using ML decoding. The low complexity search, as described previously, may be a columnwise search that takes advantage of the structure of the transmitted matrix P.

Figure 4:
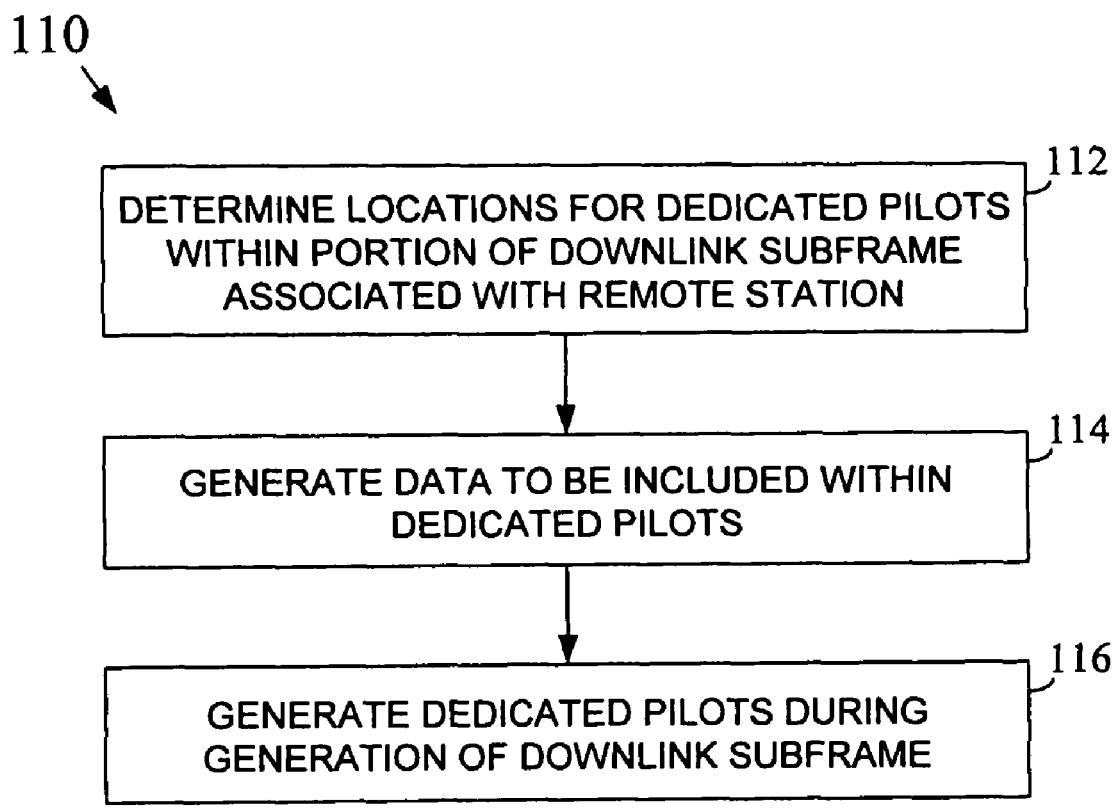
FIG. 4 is a flowchart illustrating an example method for use in a transmitting device associated with a multicarrier MIMO channel in accordance with an embodiment of the present invention.

FIG. 4 is a flowchart illustrating an example method 110 for use in a transmitting device associated with a multicarrier MIMO channel in accordance with an embodiment of the present invention. The method 110 may be used by the transmitting device to develop and deliver dedicated pilot signals to a receiving device associated with the MIMO channel for use in verifying that an identified beamforming matrix has been used by the transmitting device to precode data. First, locations for the dedicated pilots within a physical resource block of a downlink subframe are determined (block 112). As described previously, the dedicated pilots may be distributed uniformly in time and frequency within a resource allocation, with random offsets to avoid interference from neighbor cells. Other techniques may alternatively be used. Data may then be generated to be included within the dedicated pilots (block 114). In at least one embodiment, as described previously, a matrix P will be used which is an $N_s \times N_d$ matrix, where $N_s$ is the number of active spatial streams and $N_d$ is the number of dedicated pilots. Each column of P is a vector in the form [0, 0, . . . 1, . . . 0] with all the entries being zero except the $i^{th}$ entry, where i is the stream index assigned to the vector. The transmitting device may then generate the dedicated pilots to be transmitted (block 116). In one approach, this may include multiplying the matrix P by the beamforming matrix presumably identified by the receiving device and transmitting the product at the appropriate location within the downlink subframe.

The techniques and structures of the present invention may be implemented in any of a variety of different forms. For example, features of the invention may be embodied within laptop, palmtop, desktop, and tablet computers having wireless capability; personal digital assistants (PDAs) having wireless capability; cellular telephones and other handheld wireless communicators; pagers; satellite communicators; cameras having wireless capability; audio/video devices having wireless capability; network interface cards (NICs) and other network interface structures; base stations; wireless access points; integrated circuits; as instructions and/or data structures stored on machine readable media; as an article of manufacture comprising a storage medium having instructions stored thereon; and/or in other formats. Examples of different types of machine readable media that may be used include floppy diskettes, hard disks, optical disks, compact disc read only memories (CD-ROMs), digital video disks (DVDs), Blu-ray disks, magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data. In at least one form, the invention is embodied as a set of instructions that are modulated onto a carrier wave for transmission over a transmission medium. As used herein, the term "logic" may include, by way of example, software or hardware and/or combinations of software and hardware.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A computer implemented method comprising:
   determining a beamforming matrix for a transmitting device to use to precode data for transmission to a receiving device via a multicarrier MIMO channel, wherein determining is performed in said receiving device;

transmitting information, from said receiving device to said transmitting device, that identifies said beamforming matrix;

receiving dedicated pilot signals and data signals from said transmitting device, via said multicarrier MIMO channel, that were supposed to have been precoded by said transmitting device using said beamforming matrix, said dedicated pilot signals carrying known information; and processing said dedicated pilots to validate whether said transmitting device actually used said beamforming matrix to precode said dedicated pilot signals and said data signals;

wherein processing said dedicated pilots to validate whether said transmitting device actually used said beamforming matrix to precode said dedicated pilot signals and said data signals includes using maximum likelihood detection to process said dedicated pilots;

wherein using maximum likelihood detection to process said dedicated pilots includes performing a reduced complexity codebook search that includes a column wise search as follows:

$$v_i^* = \arg\min_{V_i \in Codebook} \|Y_i - Hv_i\|_2^2 \quad i = 1, ..., N_s$$

where $v_i^*$ is the estimate of the $i^{th}$ column of the beamforming matrix actually used by the transmitting device, $Y_i$ is the $i^{th}$ column of the received dedicated pilot signal Y, H is the channel matrix, and Codebook is the codebook of possible beamforming matrices.

2. The method of claim 1, further comprising:

when processing said dedicated pilots determines that said transmitting device did not use said beamforming matrix to precode said dedicated pilot signals and said data signals but, instead, used another beamforming matrix to precode said dedicated pilot signals and said data signals, demodulating said data signals using said another beamforming matrix.

3. The method of claim 1, wherein:

using maximum likelihood detection to process said dedicated pilots includes evaluating:

$$V^* = \arg\min_{V_i \in Codebook} \|Y - HV_iP\|^2$$

where V* is the estimate of the beamforming matrix actually used by the transmitting device, Y is the received dedicated pilot signal, H is the channel matrix, P is the matrix transmitted within a dedicated pilot, and codebook is the codebook of possible beamforming matrices, wherein processing said dedicated pilots includes comparing V* to said beamforming matrix.

4. The method of claim 3, wherein:

using maximum likelihood detection to process said dedicated pilots includes performing no validation when $\|Y-HV_iP\|$ is less than a threshold value that is related to signal-to-noise ratio (SNR).

5. The method of claim 4, wherein:

said threshold value is equal to $7\sigma_n$-0.5 $\log_{10}(p_e)$, where $\sigma_n^2$ the noise power and $p_e$ is the uplink bit error rate (BER).

6. A method comprising:

transmitting dedicated pilot signals from a transmitting device to a receiving device via a multicarrier MIMO channel, said dedicated pilot signals for use by said receiving device to validate whether said transmitting device utilized a specific beamforming matrix identified by said receiving device, wherein said dedicated pilot signals are distributed in time and frequency within a downlink (DL) physical resource block of said transmitting device that is directed to said receiving device, said DL physical resource block including a number of subcarriers within a number of consecutive multicarrier symbols;

wherein said dedicated pilot signals are spaced within said DL physical resource block as follows:

$$f_i = \mathrm{mod}\left(i*\left\lfloor\frac{N_c}{N_d}\right\rfloor + O_f, N_c\right), \text{ for } i = 0, 1, ..., N_d - 1$$

$$t_i = \mathrm{mod}\left(i*\left\lfloor\frac{N_o}{N_d}\right\rfloor + O_t, N_o\right), \text{ for } i = 0, 1, ..., N_d - 1$$

where the DL physical resource block consists of subcarriers indexed from 0 through $N_c$-1 and OFDM symbols indexed from 0 through $N_s$-1, $f_i$ and $t_i$ are the subcarrier and symbol indices of the dedicated pilots, $N_d$ is the number of dedicated pilots in a physical resource block, mod( ) is the modulo operation; and $O_f$ and $O_t$ are random offsets in frequency and time determined by the transmitting device.

7. The method of claim 6, wherein:

said dedicated pilot signals are approximately uniformly spaced in time and frequency within said DL resource allocation, with random offsets to avoid interference from neighbor cells.

8. The method of claim 6, wherein:

said dedicated pilot signals each carry a matrix P which is an $N_s \times N_d$ matrix, where $N_s$ is the number of active spatial streams in the multicarrier MIMO channel, $N_d$ is the number of dedicated pilots in a physical resource block, and each column of P is a vector in the form [0, 0, . . . 1, . . . 0] with all entries being zero except the $i^{th}$ entry, where i is the stream index assigned to the vector.

9. The method of claim 8, wherein:

said dedicated pilots are assigned to the spatial streams of the beamformed multicarrier MIMO channel in a round-robin fashion.

10. An apparatus comprising:

a wireless transceiver to facilitate communication with a remote wireless entity through a multicarrier MIMO channel; and a controller to receive dedicated pilots signals and data signals from a remote wireless entity, via said wireless transceiver, and to process said dedicated pilot signals to determine whether said remote wireless entity used a predetermined beamforming matrix to precode said dedicated pilot signals and said data signals;

wherein said dedicated pilot signals each carry a matrix $N_t \times N_d$ which is an matrix, where $N_d$ is the number of active spatial streams in the multicarrier MIMO channel, $N_t$ is the number of transmit antennas of the transmitting device, and each column of P is a vector in the form [0, 0, . . . 1, . . . 0] with all entries being zero except the $i^{th}$ entry, where i is the stream index assigned to the vector.

11. The apparatus of claim 10, wherein:

said dedicated pilot signals and data signals are received as part of a downlink (DL) physical resource block within a downlink subframe, said DL physical resource block including a number of subcarriers within a number of consecutive multicarrier symbols, wherein said dedicated pilot signals are uniformly spaced in time and frequency within said DL resource allocation, with random offsets to avoid interference from neighbor cells.

12. The apparatus of claim 11, wherein:
said dedicated pilot signals are spaced within said DL physical resource block as follows:

$$f_i = \mathrm{mod}\left(i * \left\lfloor \frac{N_c}{N_d} \right\rfloor + O_f, N_c\right), \text{ for } i = 0, 1, \ldots, N_d - 1$$

$$t_i = \mathrm{mod}\left(i * \left\lfloor \frac{N_o}{N_d} \right\rfloor + O_t, N_o\right), \text{ for } i = 0, 1, \ldots, N_d - 1$$

where the DL physical resource block consists of subcarriers indexed from 0 through $N_c$-1 and OFDM symbols indexed from 0 through $N_s$-1, $f_i$ and $t_i$ are the subcarrier and symbol indices of the dedicated pilots, $N_d$ is the number of dedicated pilots in a physical resource block, mod( ) is the modulo operation; and $O_f$ and $O_t$ are random offsets in frequency and time determined by the transmitting device.

13. The apparatus of claim 10, wherein:
said controller uses maximum likelihood detection to process said dedicated pilots to determine whether said remote wireless entity used a predetermined beamforming matrix to precode said dedicated pilot signals and said data signals.

14. The apparatus of claim 13, wherein:
said controller includes logic to evaluate:

$$V^* = \underset{V_i \in Codebook}{\arg\min} \|Y - HV_iP\|^2$$

where V* is the estimate of the beamforming matrix actually used by the transmitting device, Y is the received dedicated pilot signal, H is the channel matrix, P is the matrix transmitted within the dedicated pilot signal, and codebook is the codebook of possible beamforming matrices.

15. The apparatus of claim 14, wherein:
said controller includes logic to determine which beamforming matrix was actually used by said transmitting device to precode said data and said dedicated pilot signals and logic to compare said beamforming matrix that was actually used by said transmitting device to said predetermined beamforming matrix.

16. An article comprising a storage medium having instructions stored thereon that, when executed by a computing platform, operate to:
determine a beamforming matrix for a transmitting device to use to precode data for transmission to a receiving device via a multicarrier MIMO channel, wherein determining is performed in said receiving device;
transmit information that identifies said beamforming matrix from said receiving device to said transmitting device;
receive dedicated pilot signals and data signals from said transmitting device, via said multicarrier MIMO channel, that were supposed to have been precoded by said transmitting device using said beamforming matrix, said dedicated pilot signals carrying known information; and
process said dedicated pilots to validate whether said transmitting device actually used said beamforming matrix to precode said dedicated pilot signals and said data signals;
wherein said operation to process said dedicated pilots includes operation to use maximum likelihood detection to process said dedicated pilots; and wherein operation to use maximum likelihood detection to process said dedicated pilots includes operation to perform no validation when $\|Y-HV_iP\|$ is less than a threshold value that is related to signal-to-noise ratio (SNR).

17. The article of claim 16, wherein:
operation to use maximum likelihood detection to process said dedicated pilots includes operation to evaluate:

$$V^* = \underset{V_i \in Codebook}{\arg\min} \|Y - HV_iP\|^2$$

where V* is the estimate of the beamforming matrix actually used by the transmitting device, Y is the received dedicated pilot signal, H is the channel matrix, P is the matrix transmitted within a dedicated pilot, and codebook is the codebook of possible beamforming matrices, wherein processing said dedicated pilots includes comparing V* to said beamforming matrix.

18. The article of claim 16, wherein:
operation to use maximum likelihood detection to process said dedicated pilots includes operation to perform a reduced complexity codebook search that includes a column wise search as follows:

$$v_i^* = \underset{v_i \in Codebook}{\arg\min} \|Y_i - Hv_i\|_2^2 \quad i = 1, \ldots, N_d$$

where $v_i^*$ is the estimate of the $i^{th}$ column of the beamforming matrix actually used by the transmitting device, $Y_i$ is the $i^{th}$ column of the received dedicated pilot signal Y, H is the channel matrix, and codebook is the codebook of possible beamforming matrices.

19. A system comprising:
multiple dipole antennas;
a wireless transceiver, coupled to said multiple dipole antennas, to facilitate communication with a remote wireless entity through a multicarrier MIMO channel; and
a controller to receive dedicated pilots signals and data signals from a remote wireless entity, via said wireless transceiver, and to process said dedicated pilot signals to determine whether said remote wireless entity used a predetermined beamforming matrix to precode said dedicated pilot signals and said data signals;
wherein said dedicated pilot signals each carry a matrix P which is an $N_t \times N_d$ matrix where $N_d$ is the number of active spatial streams in the multicarrier MIMO channel, $N_t$ is the number of transmit antennas of the transmitting device, and each column of P is a vector in the form [0, . . . 1, . . . 0] with all entries being zero except the $i^{th}$ entry, where i is the stream index assigned to the vector.

20. The system of claim 19, wherein:
said dedicated pilot signals and data signals are received as part of a downlink (DL) physical resource block within a downlink subframe, said DL physical resource block including a number of subcarriers within a number of consecutive multicarrier symbols, wherein said dedicated pilot signals are uniformly spaced in time and frequency within said DL resource allocation, with random offsets to avoid interference from neighbor cells.

21. The system of claim 19, wherein:
said dedicated pilot signals each carry a matrix P which is an $N_s \times N_d$ matrix, where $N_s$ is the number of active spatial streams in the multicarrier MIMO channel, $N_d$ is the number of dedicated pilots in a physical resource block, and each column of P is a vector in the form [0, 0, . . .

1, ... 0] with all entries being zero except the jib entry, where i is the stream index assigned to the vector.

22. The system of claim 19, wherein:

said controller uses maximum likelihood detection to process said dedicated pilots to determine whether said remote wireless entity used a predetermined beamforming matrix to precode said dedicated pilot signals and said data signals.

23. The system of claim 22, wherein:

said controller includes logic to evaluate:

$$V^* = \underset{V_i \in Codebook}{\arg\min} \|Y - HV_iP\|^2$$

where $V^*$ is the estimate of the beamforming matrix actually used by the transmitting device, Y is the received dedicated pilot signal, H is the channel matrix, P is the matrix transmitted within the dedicated pilot signal, and codebook is the codebook of possible beamforming matrices.

24. The system of claim 19, wherein:

said controller includes logic to determine which beamforming matrix was actually used by said transmitting device to precode said data and said dedicated pilot signals and logic to compare said beamforming matrix that was actually used by said transmitting device to said predetermined beamforming matrix.

* * * * *

UNITED STATES PATENT AND TRADEMARK OFFICE
CERTIFICATE OF CORRECTION

| | | |
|---|---|---|
| PATENT NO. | : 7,720,470 B2 | Page 1 of 1 |
| APPLICATION NO. | : 11/455891 | |
| DATED | : May 18, 2010 | |
| INVENTOR(S) | : Jun Shi et al. | |

It is certified that error appears in the above-identified patent and that said Letters Patent is hereby corrected as shown below:

On title page, item 57, in column 2, under "ABSTRACT" line 9, delete "preceding," and insert -- precoding, --, therefor.

In column 9, line 62, in claim 5, delete "$7\sigma_n$" and insert -- $7\sigma_n^2$ --, therefor.

In column 10, line 56, in claim 10, delete "$N_t x N_d$ which is an matrix," and insert -- P which is an $N_t x N_d$ matrix, --, therefor.

In column 12, line 48, in claim 19, delete "matrix" and insert -- matrix, --, therefor.

In column 13, line 1, in claim 21, delete "jib" and insert -- $i^{th}$ --, therefor.

Signed and Sealed this

Third Day of August, 2010

David J. Kappos
*Director of the United States Patent and Trademark Office*